(12) United States Patent
Morimoto et al.

(10) Patent No.: US 10,239,472 B2
(45) Date of Patent: Mar. 26, 2019

(54) AUTOMOTIVE DOOR-HOLE-SEALING MATERIAL

(71) Applicant: NISHIKAWA RUBBER CO., LTD., Hiroshima (JP)

(72) Inventors: Keisuke Morimoto, Hiroshima (JP); Hiroaki Kaneda, Hiroshima (JP); Mitsuaki Arata, Hiroshima (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 47 days.

(21) Appl. No.: 15/713,631

(22) Filed: Sep. 23, 2017

(65) Prior Publication Data
US 2018/0093621 A1 Apr. 5, 2018

(30) Foreign Application Priority Data

Oct. 3, 2016 (JP) .................................. 2016-195467

(51) Int. Cl.
*B60J 5/00* (2006.01)
*B60R 13/08* (2006.01)
*B60J 10/86* (2016.01)
*B60J 10/15* (2016.01)

(52) U.S. Cl.
CPC ........... *B60R 13/0815* (2013.01); *B60J 10/15* (2016.02); *B60J 10/86* (2016.02)

(58) Field of Classification Search
CPC ....... B62D 29/002; B29C 66/71; B29C 44/18; C04B 18/24; C08G 18/10; C08F 220/00; C08F 259/04; C08F 291/00; C08L 2666/04; A61L 15/60

USPC ....................................................... 296/146.7
See application file for complete search history.

(56) References Cited

U.S. PATENT DOCUMENTS

| | | | | |
|---|---|---|---|---|
| 5,154,961 A | * | 10/1992 | Reuben ................ | A43B 3/0078 15/215 |
| 5,514,458 A | * | 5/1996 | Schulze-Kadelbach ..................... | B32B 27/12 442/56 |
| 5,549,324 A | * | 8/1996 | Labrie ................... | B60R 21/205 264/46.5 |
| 2004/0104598 A1 | * | 6/2004 | Barz ...................... | B62D 25/04 296/187.02 |
| 2005/0064779 A1 | * | 3/2005 | Allison ................... | B32B 3/16 442/181 |

(Continued)

FOREIGN PATENT DOCUMENTS

| JP | 2005-47377 A | 2/2005 |
|---|---|---|
| JP | 2007-290668 A | 11/2007 |
| WO | WO 2007127780 A2 | 11/2007 |

*Primary Examiner* — Kiran B Patel
(74) *Attorney, Agent, or Firm* — Renner Otto Boisselle & Sklar, LLP

(57) ABSTRACT

An automotive door-hole-sealing material reduces noise to be generated by contact between the sheeted foam elastic material and the protrusion, and, moreover, improves quietness inside the passenger compartment with high sound absorption performance and sound insulating effect. The automotive door-hole-sealing material 1 includes a resin sheet 2, and a sheeted foam elastic material 3. The resin sheet 2 has a through hole 2c formed in association with a protruding end of the impact absorbing material 105. In a side view, the sheeted foam elastic material 3 has a portion relaxing within an inner periphery of the through hole 2c of the resin sheet 2.

4 Claims, 8 Drawing Sheets

(56) References Cited

U.S. PATENT DOCUMENTS

| | | | | |
|---|---|---|---|---|
| 2006/0097544 | A1* | 5/2006 | Cowelchuk | B29C 45/1676 |
| | | | | 296/146.7 |
| 2008/0038505 | A1* | 2/2008 | Salzmann | A47C 5/00 |
| | | | | 428/71 |
| 2008/0309109 | A1* | 12/2008 | Heinz | B29C 44/1209 |
| | | | | 296/39.1 |
| 2014/0230336 | A1* | 8/2014 | Flener | B60J 5/0412 |
| | | | | 49/472 |

* cited by examiner

FRONT ←    → REAR

FRONT ← → REAR

AUTOMOTIVE DOOR-HOLE-SEALING MATERIAL

CROSS-REFERENCE TO RELATED APPLICATION

This application claims priority to Japanese Patent Application No. 2016-195467 filed on Oct. 3, 2016, the entire disclosure of which is incorporated by reference herein.

BACKGROUND

The present disclosure relates to an automotive door-hole-sealing material for sealing, for example, an opening formed on an inner panel of an automotive door. In particular, the present disclosure belongs to a technical field of a structure which allows the automotive door-hole-sealing material to be attached to an inner panel of the automotive door having a protrusion protruding from the opening on the inner panel in an inward-outward direction of a passenger compartment.

An inner panel of an automotive door has, for example, a work opening for securing various parts inside the door and an opening for installing a speaker. To cover these openings, a door-hole-sealing material is attached to the inner panel.

Known examples of door-hole-sealing materials in this kind include materials disclosed in Japanese Unexamined Patent Publication No. 2005-47377 and Japanese Unexamined Patent Publication No. 2007-290668. The door-hole-sealing material in Japanese Unexamined Patent Publication No. 2005-47377 is a resin sheet. A circumferential edge of the resin sheet is provided with an adhesive portion to an inner panel. This adhesive portion is formed stepwise to bulge with respect to other portions of the resin sheet. The adhesive portion is also formed thinner than the other portions.

Moreover, the door-hole-sealing material in Japanese Unexamined Patent Publication No. 2007-290668 includes a core layer containing an elastic material and a non-elastic skin layer provided to each face of the core layer. A resin film included in the skin layer is stretched until the resin film exceeds its elastic deformation limit, and plastically deformed.

An automotive door may be provided with an impact absorbing member for reducing a side impact to be applied on a passenger when a car is in a side impact collision. This impact absorbing member needs to have a predetermined size or larger in width direction of the car to achieve an impact absorption effect. Hence, the impact absorbing member can be provided to protrude from an interior face of the door close to passenger compartment through an opening on the inner panel to the inside of the door.

Here, as Japanese Unexamined Patent Publication No. 2005-47377 discloses, for example, a portion of a door-hole-sealing material may bulge to conform to the impact absorbing member so that high interference between the door-hole-sealing material and the impact absorbing member may be alleviated.

However, the door-hole-sealing material in Japanese Unexamined Patent Publication No. 2005-47377 contains a resin sheet. This resin sheet could be a cause of noise generated when the door-hole-sealing material makes contact with the impact absorbing member by, for example, the vibrations of a running car. Moreover, the resin sheet in Japanese Unexamined Patent Publication No. 2005-47377 is solid, and thus low in sound absorption effect. Hence, the door-hole-sealing material may contribute little to improvement in quietness in the passenger compartment. Furthermore, there is another problem: since the bulging portion of the door-hole-sealing material becomes thin, noise out of the passenger compartment easily passes through the thin bulging portion.

To overcome the problems, a door-hole-sealing material in Japanese Unexamined Patent Publication No. 2007-290668 may be used in a manner that a portion of the door-hole-sealing material is stretched to alleviate high interference between the door-hole-sealing material and an impact absorbing member. However, a skin layer in Japanese Unexamined Patent Publication No. 2007-290668 is not elastic, and could be a cause of noise generated when making contact with an impact absorbing member by, for example, the vibrations of a running car as seen in Japanese Unexamined Patent Publication No. 2005-47377. Moreover, in Japanese Unexamined Patent Publication No. 2007-290668, the skin layer is provided to each face of the core layer, and thus insufficient in sound absorption effect. Furthermore, the skin layer is stretched until exceeding its elastic deformation limit, and becomes thin. The core layer also becomes thin because it is deformed in conformity with the impact absorbing member. Specifically, the door-hole-sealing material in Japanese Unexamined Patent Publication No. 2007-290668 also has a problem that noise out of the passenger compartment easily passes through the material.

The present disclosure is conceived in view of the above problems. When a protrusion is provided to protrude from an opening on an inner panel of a door in an inward-outward direction of a passenger compartment, the present disclosure attempts to alleviate high interference with the protrusion, reduce noise generated by contact with the protrusion, and improve quietness inside the passenger compartment with high noise absorption performance and noise insulating effect.

SUMMARY

In order to achieve the above attempts, the present disclosure includes a resin sheet attached to an inner panel and a sheeted foam elastic material covering an opening on the inner panel. When adhering to the resin sheet, the sheeted foam elastic material relaxes within an inner periphery of a through hole of the resin sheet.

A first aspect of the present disclosure relates to an automotive door-hole-sealing material covering an opening formed on an inner panel of an automotive door. The automotive door-hole-sealing material includes: a sheeted foam elastic material (i) provided over a protruding end of a protrusion protruding from the opening on the inner panel in an inward-outward direction of a passenger compartment, and (ii) covering the opening; and a resin sheet to which the sheeted foam elastic material is fastened, the resin sheet being attached to the inner panel. The resin sheet having a through hole formed in association with the protruding end of the protrusion, and in a side view, the sheeted foam elastic material has a portion relaxing within an inner periphery of the through hole of the resin sheet.

In this configuration, the resin sheet to which the sheeted foam elastic material adheres is attached to the inner panel of a door. In this state, the through hole is open on a portion of the resin sheet in association with the protruding end of the protrusion. The sheeted foam elastic material is provided over the protruding end of the protrusion to cover the opening on the inner panel. Here, the sheeted foam elastic material relaxes within the inner periphery of the through hole of the resin sheet to avoid the protrusion protruding from the opening on the inner panel toward the inward-outward direction of the passenger compartment. Such a feature reduces the risk of high interference between the protrusion and the sheeted foam elastic material.

Moreover, if vibration is generated while the car is running, for example, the sheeted foam elastic material elastically deforms when making contact with the protrusion. Such a feature may reduce noise. The sheeted foam elastic material covers the opening on the inner panel. Such a feature allows the sheeted foam elastic material to absorb noise. The sheeted foam elastic material is provided to avoid the protrusion. Here, the sheeted foam elastic material already relaxes to keep from receiving forcible tension. That is why the sheeted foam elastic material is not as thin as a material disclosed in a typical example. Such a feature allows the sheeted foam elastic material to maintain high sound absorption and insulation effects.

A second aspect of the present disclosure relates to the automotive door-hole-sealing material of the first aspect. The resin sheet may contain a material less stretchable than the sheeted foam elastic material.

In this configuration, the resin sheet is less stretchable than the sheeted foam elastic material. When the sheeted foam elastic material is relaxed and adheres to the resin sheet, the resin sheet overcomes the resilience of the sheeted foam elastic material and keeps from stretching, contributing to maintaining the sheeted foam elastic material to relax.

A third aspect of the present disclosure relates to the automotive door-hole-sealing material of the first aspect. The relaxing portion of the sheeted foam elastic material may be approximately as thick as other portions of the sheeted foam elastic material.

In this configuration, the relaxing portion of the sheeted foam elastic material is sufficiently thick (i.e., approximately as thick as other portions of the sheeted foam elastic material), achieving a high sound absorbing effect.

A fourth aspect of the present disclosure relates to the automotive door-hole-sealing material of the first aspect. The sheeted foam elastic material may adhere to a whole outer periphery of the through hole of the resin sheet.

In this configuration, the sheeted foam elastic material adheres to the whole outer periphery of the through hole of the resin sheet. Such a feature may reliably maintain the sheeted foam elastic material to relax within the inner periphery of the through hole. Moreover, the feature may reduce the risk of noise and water entering the passenger compartment from a gap between the circumferential edge of the through hole of the resin sheet and the sheeted foam elastic material.

In the first aspect, the resin sheet is attached to the inner panel and the sheeted foam elastic material covers an opening on the inner panel. When adhering to the resin sheet, the sheeted foam elastic material relaxes within the inner periphery of a through hole of the resin sheet. Such features may alleviate high interference between the sheeted foam elastic material and a protrusion without generating noise, and, moreover, improve quietness in the passenger compartment with high noise absorption performance and noise insulating effect.

In the second aspect, the resin sheet is less stretchable than the sheeted foam elastic material. Such a feature makes it possible for the resin sheet to overcome the resilience of the sheeted foam elastic material, contributing to maintaining the sheeted foam elastic material to relax.

In the third aspect, the relaxing portion of the sheeted foam elastic material may be sufficiently thick, contributing to a high sound absorbing effect.

In the fourth aspect, the sheeted foam elastic material adheres to the whole outer periphery of the through hole of the resin sheet, contributing to reliably maintaining the sheeted foam elastic material to relax and further sealing the passenger compartment.

DETAILED DESCRIPTION

An embodiment of the present disclosure will be described in detail below with reference to the drawings. The following description of an advantageous embodiment is only an example in nature, and is not intended to limit the scope, applications or use of the present disclosure.

Figure 1:
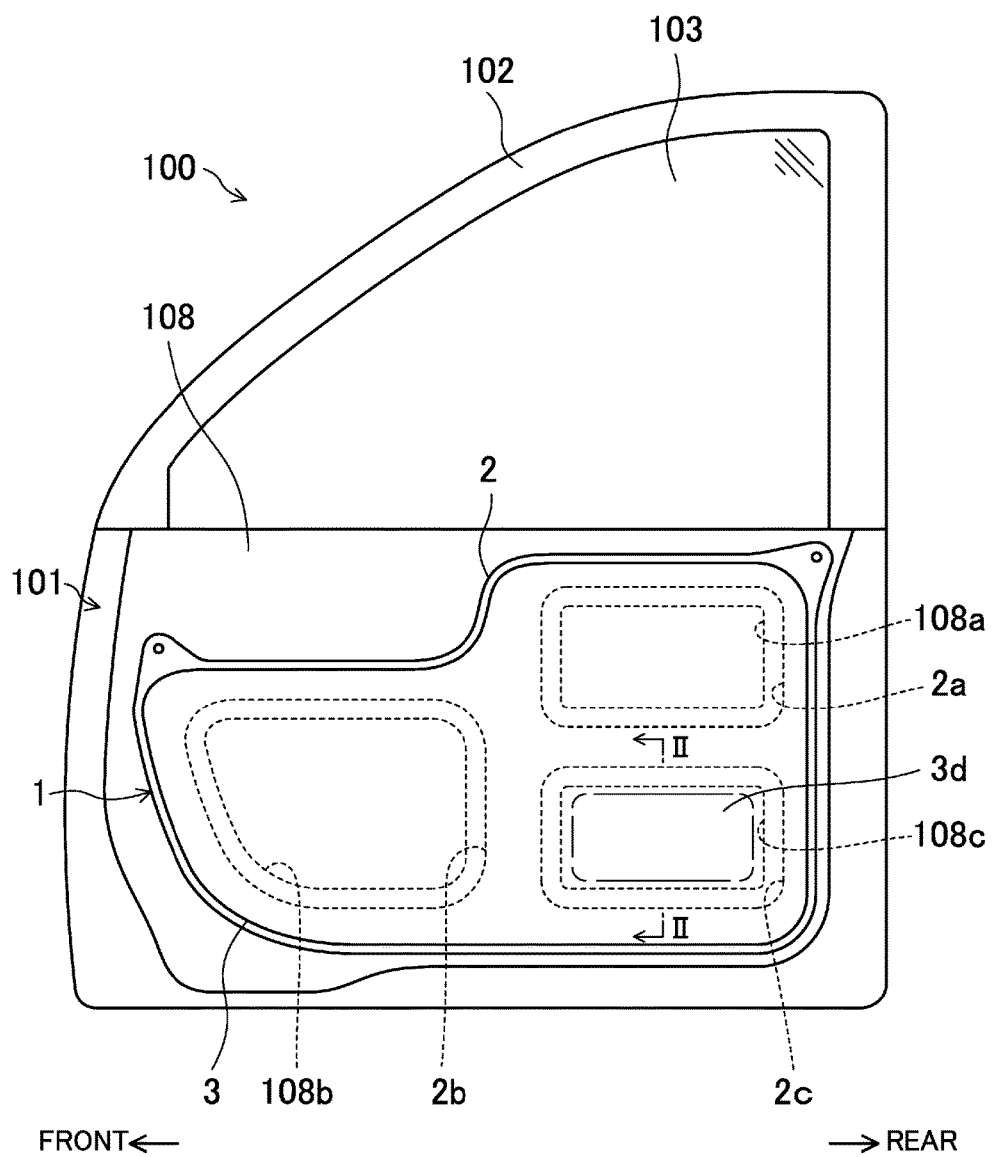
FIG. 1 is a side view of an automotive door to which an automotive door-hole-sealing material according to an embodiment is attached. The automotive door is observed from an inner panel, and a door trim and an impact absorbing material are omitted from the automotive door.

FIG. 1 is a side view of an automotive door 100 to which an automotive door-hole-sealing material 1 according to an embodiment of the present disclosure is attached. The automotive door 100 is observed from an inner panel. FIG. 1 omits a door trim 104 and an impact absorbing material 105 illustrated in FIG. 2. The automotive door 100 is for opening and closing a not-shown door opening formed on a side of a passenger car. The automotive door 100 has a front end rotatably secured to a pillar of the body via a door hinge.

Figure 2:
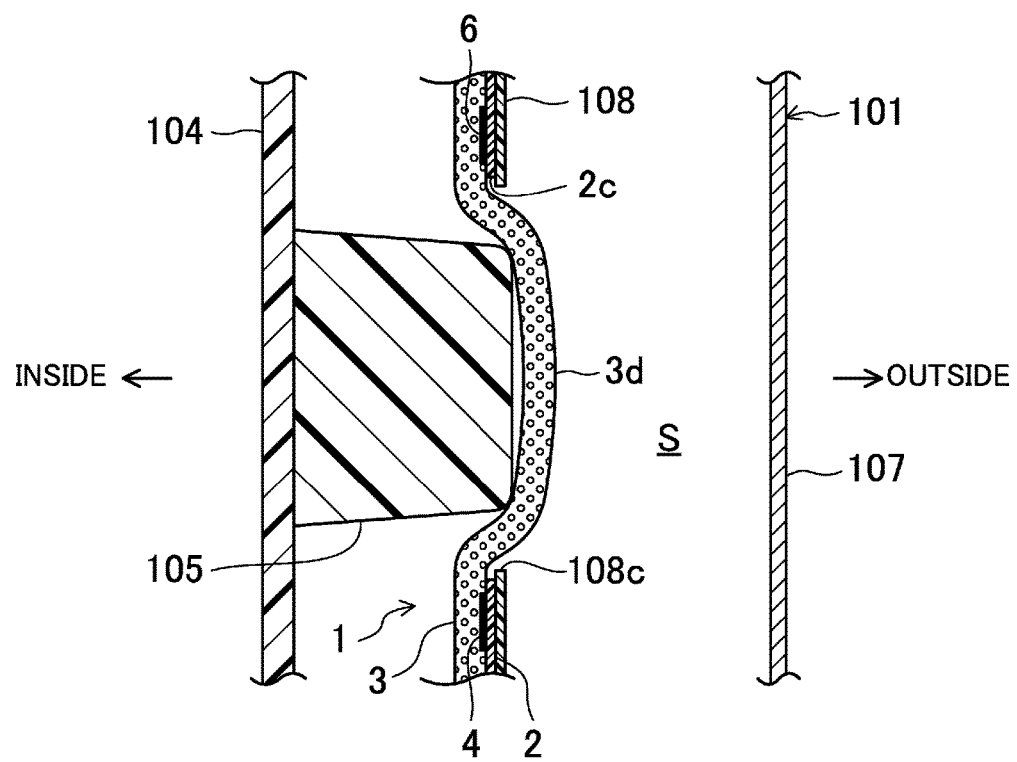
FIG. 2 is a cross-sectional view taken along a line II-II of FIG. 1, illustrating the door trim and the impact absorbing material.

The automotive door 100 includes at least a door body 101 which is a lower portion of the automotive door 100, a sash 102 which is an upper portion of the automotive door 100, a door glass 103, the door trim 104 illustrated in FIG. 2, and the impact absorbing material (a protrusion) 105 illustrated in FIG. 2. The sash 102 holds a circumferential edge of the door glass 103, and guides the door glass 103 in a vertical direction. This sash 102 may be omitted.

As illustrated in FIG. 2, the door body 101 includes an outer panel 107 which is an exterior face of the door body 101 toward the outside of the passenger compartment, and an inner panel 108 which is an interior face of the door body 101 toward the passenger compartment. A circumferential edge of the outer panel 107 and a circumferential edge of the inner panel 108 join to define a hollow S.

The hollow S houses the door glass 103 in a down position. The hollow S also houses, for example, a not-shown window regulator moving the door glass 103 up and down, and a not-shown guide rail guiding the door glass 103.

As illustrated in FIG. 1, the inner panel 108 has a first opening 108a, a second opening 108b, and a third opening 108c all of which are called door holes. The first opening 108a, the second opening 108b, and the third opening 108c are formed for the work of housing various components such as a window regulator in the hollow S of the door body 101 and securing various parts to the inner panel 108. The first opening 108a, the second opening 108b, and the third opening 108c formed for the work act as access holes. Moreover, not all the holes have to be the access holes. At least one of the first opening 108a, the second opening 108b, and the third opening 108c can be used for installing a not-shown speaker. Note that the shape, number and position of the first opening 108a, the second opening 108b, and the third opening 108c may be selected freely.

The door trim 104 only partially illustrated in FIG. 2, contains, for example, a resin material. The door trim 104 is formed to cover an interior face of the inner panel 108 toward the passenger compartment, and secured to the inside of the inner panel 108 toward the passenger compartment. In this embodiment, the impact absorbing material 105 is provided to the outside of the door trim 104 toward the passenger compartment. The impact absorbing material 105 reduces a side impact to be applied on a passenger when the car is in a side impact collision. The impact absorbing material 105 is designed to have a predetermined size or larger in width direction of the car to achieve a sufficient impact absorption effect. This predetermined size is greater than a spaced distance between the door trim 104 and the inner panel 108 in the width direction of the car. Thus, a position of the third opening 108c formed on the inner panel 108 is determined in association with a position in which the impact absorbing material 105 is provided. Specifically, when observed in the width direction of the car, the impact absorbing material 105 is positioned within an inner periphery of the third opening 108c of the inner panel 108. Hence, the impact absorbing material 105 is provided to protrude from the third opening 108c on the inner panel 108 toward the inside of the hollow S (to the outside in the width direction of the car).

Structure of Automotive Door-Hole-Sealing Material

The automotive door-hole-sealing material 1 covers the first opening 108a, the second opening 108b, and the third opening 108c on the inner panel 108 from the inside of the passenger compartment. The automotive door-hole-sealing material 1 includes a resin sheet 2 and a sheeted foam elastic material 3.

An example of the resin sheet 2 is a polyethylene sheet. The resin sheet 2 contains, for example, a material less stretchable than the sheeted foam elastic material 3 when pulled in the longitudinal and vertical directions. The resin sheet 2 is larger in outline than an area in which the first opening 108a, the second opening 108b, and the third opening 108c on the inner panel 108 are formed. The resin sheet 2 may be designed to have a thickness of, for example, approximately 0.1 mm. The resin sheet 2 may be attached to the inner panel 108 with the whole circumferential edge of the resin sheet 2 applied with, for example, butyl sealant to the interior face of the inner panel 108 toward the passenger compartment.

As illustrated in FIG. 1, the resin sheet 2 has: a first through hole 2a formed over the first opening 108a on the inner panel 108; a second through hole 2b formed over the second opening 108b on the inner panel 108; and a third through hole 2c formed over the third opening 108c on the inner panel 108. As illustrated in FIG. 2, the resin sheet 2 has the third through hole 2c formed in association with a protruding end (toward the outside of the passenger compartment) of the impact absorbing material 105. Hence, the protruding end of the impact absorbing material 105 is positioned within the inner periphery of the third through hole 2c.

Examples of the sheeted foam elastic material 3 include various kinds of rubber such as ethylene-propylene-diene rubber (EPDM), chloroprene rubber (CR), styrene-butadiene rubber (SBR) and acrylonitrilebutadiene rubber (NBR), and various kinds of thermoplastic elastomer foam such as thermoplastic elastomer olefin (TPO) and thermoplastic elastomer styrene (TPS). The sheeted foam elastic material 3 is thicker than the resin sheet 2, and designed to have a thickness of, for example, approximately 10 mm. Moreover, the sheeted foam elastic material 3 is smaller in outline than the resin sheet 2. The sheeted foam elastic material 3 is fastened to the inside of the resin sheet 2 toward the passenger compartment. In this embodiment, the sheeted foam elastic material 3 adheres to the resin sheet 2 by a technique described later.

The resin sheet 2 mainly acts as an attaching member for attaching the sheeted foam elastic material 3 to the inner panel 108; whereas, mainly for covering the first opening 108a, the second opening 108b, and the third opening 108c on the inner panel 108, the sheeted foam elastic material 3 absorbs and reduces noise. A portion of the sheeted foam elastic material 3 for covering the third opening 108c is provided over the protruding end of the impact absorbing material 105 protruding from the third opening 108c to outside of the passenger compartment.

Figure 3:
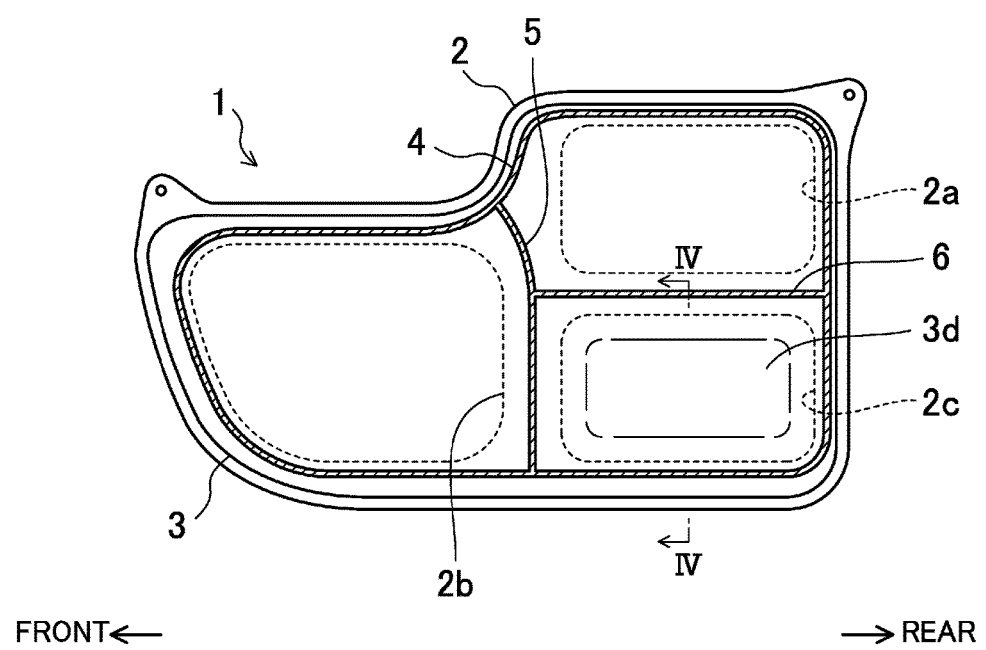
FIG. 3 is a side view of the automotive door-hole-sealing material observed from the inside of a passenger compartment.

An adhesion portion of the resin sheet 2 and the sheeted foam elastic material 3 is shaded as illustrated in FIG. 3. The adhesion portion includes an outer periphery adhesion portion 4, an intermediate adhesion portion 5, and a rear adhesion portion 6. The outer periphery adhesion portion 4 is provided to stick an outer periphery of the sheeted foam elastic material 3 with an outer periphery of the resin sheet 2. The outer periphery adhesion portion 4 extends in a ring. The intermediate adhesion portion 5 is provided to stick a longitudinally intermediate portion of the sheeted foam elastic material 3 with a portion between the second through hole 2b and the first and third through holes 2a and 2c of the resin sheet 2. The intermediate adhesion portion 5 extends vertically. This intermediate adhesion portion 5 has an upper end and a lower end respectively continuous to an upper portion and a lower portion of the outer periphery adhesion portion 4. The rear adhesion portion 6 is provided to stick a vertically intermediate portion in a generally rear portion of the sheeted foam elastic material 3 with a portion between the first through hole 2a and the third through hole 2c of the resin sheet 2. The rear adhesion portion 6 extends longitudinally. The rear adhesion portion 6 has a front end continuous to a vertically intermediate portion of the intermediate adhesion portion 5, and a rear end continuous to a rear of the outer periphery adhesion portion 4.

The adhesion portions 4 to 6 seal all the gaps between: the circumferential edge of the first through hole 2a of the resin sheet 2 and the sheeted foam elastic material 3; the circumferential edge of the second through hole 2b and the sheeted foam elastic material 3; and the circumferential edge of the third through hole 2c and the sheeted foam elastic material 3. Note that the position and shape of the adhesion portions 4 to 6 may be changed, depending on the position, shape, and number of the through holes of the resin sheet 2.

Furthermore, the sheeted foam elastic material 3 may adhere to the resin sheet 2 with adhesive.

Figure 4:
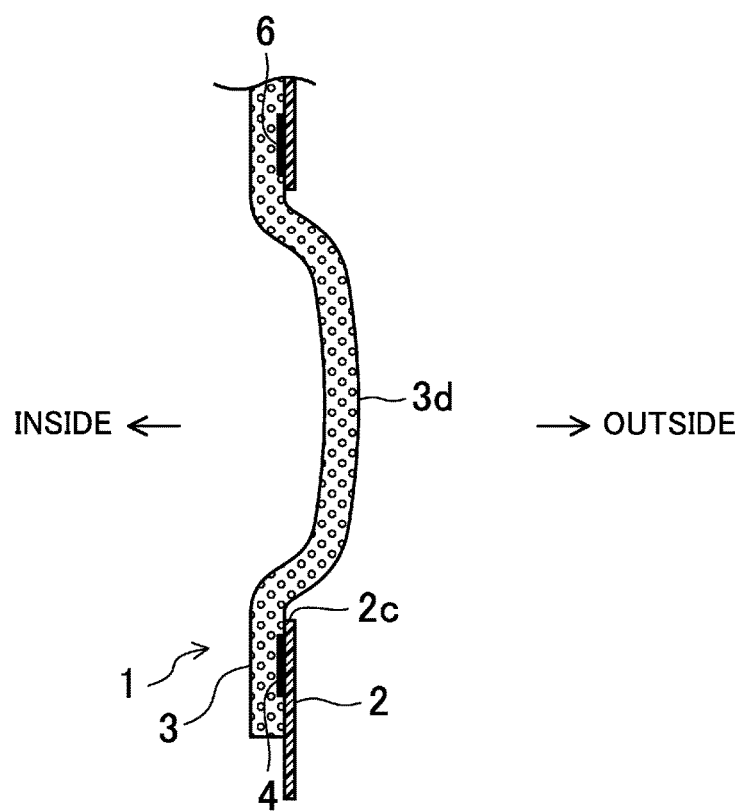
FIG. 4 is a cross-sectional view taken along a line IV-IV of FIG. 3.
Figure 5:
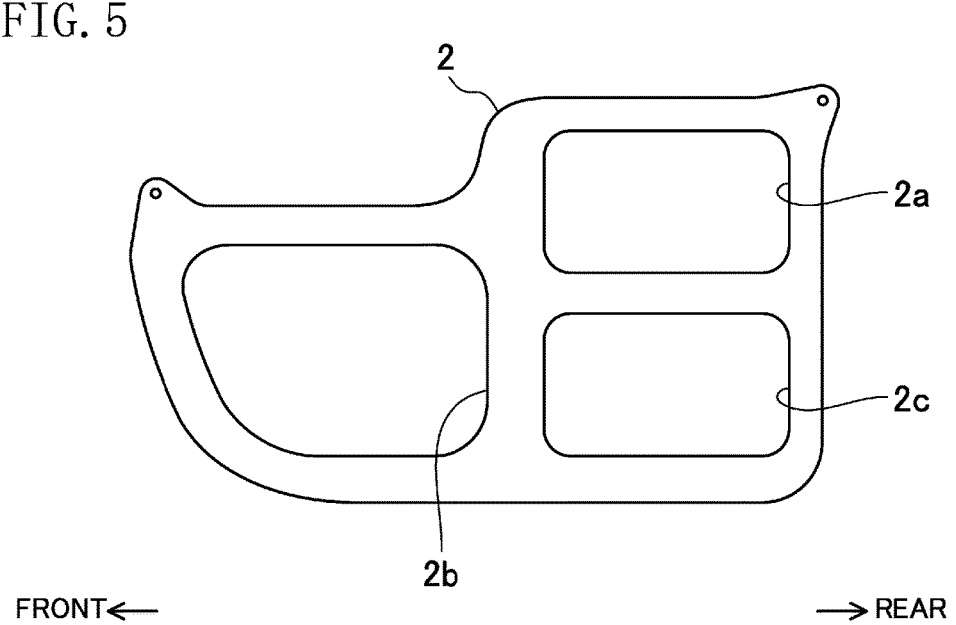
FIG. 5 is a side view of a resin sheet observed from the inside of the passenger compartment.

In the side view illustrated in FIG. 3, a portion 3d positioned within an inner periphery of the third through hole 2c of the resin sheet 2 on the sheeted foam elastic material 3 is a cover provided over the protruding end of the impact absorbing material 105. This cover 3d relaxes within the inner periphery of the third through hole 2c of the resin sheet 2. As illustrated in FIG. 4, the relaxing cover 3d bulges toward the outside of the passenger compartment. The cover 3d of the sheeted foam elastic material 3 is approximately as thick as other portions of the sheeted foam elastic material 3. The term "approximately as thick as" means that there is substantially very little difference when the cover 3d is compared in absorption and insulation of noise with other portions of the sheeted foam elastic material 3 (e.g., portions to cover the first opening 108a and the second opening 108b). Beneficially, the thickness of the cover 3d may range from 90% to 110% of the thickness of other portions of the sheeted foam elastic material 3.

The cover 3d of the sheeted foam elastic material 3 is designed to relax to the degree that, when the cover 3d covers the protruding end of the impact absorbing material 105, the sheeted foam elastic material 3 is kept from receiving forceful tension; that is, the sheeted foam elastic material 3 may alleviate high interference with the impact absorbing material 105. Specifically, when the impact absorbing material 105 is covered by the cover 3d over the protruding end, the cover 3d bulges outside of the passenger compartment by the protrusion of the impact absorbing material 105 from the third opening 108c of the inner panel 108 toward the outside of the passenger compartment. Here, the tip end of the impact absorbing material 105 could push the cover 3d toward the outside of the passenger compartment. This push applies tensile force to the sheeted foam elastic material 3. If this tension is high, the resin sheet 2 receives tension since the sheeted foam elastic material 3 is fastened to the resin sheet 2 and it makes difficult for an assembly worker to secure the door trim 104 to the inner panel 108 after the resin sheet 2 is attached to the inner panel 108. Then, even if the door trim 104 can be secured to the inner panel 108, the resin sheet 2 might peal off the inner panel 108 as time goes by. In this embodiment, even if the tip end of the impact absorbing material 105 pushes the cover 3d toward the outside of the passenger compartment, the tension applied to the sheeted foam elastic material 3 is managed not to be excessively high so that the assembly worker may easily secure the door trim 104 to the inner panel 108. The managed tension also reduces the risk that the resin sheet 2 peels off the inner panel 108 as time goes by.

In addition, the cover 3d of the sheeted foam elastic material 3 may be designed to relax to the degree that the cover 3d merely makes contact with the tip end of the impact absorbing material 105, and receives almost no tension. Such features make it possible to hardly reduce the thickness of the cover 3d, keeping the cover 3d from deteriorating in absorption and reduction of noise.

Figure 6:
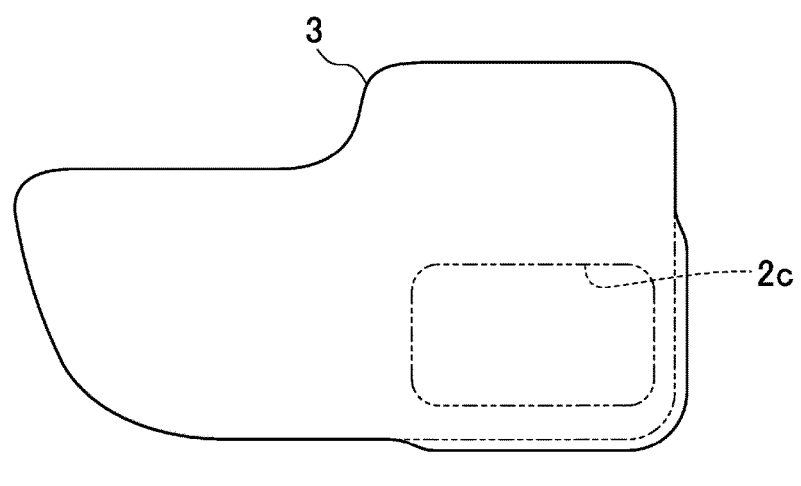
FIG. 6 is a side view of a sheeted foam elastic material before adhesion observed from the inside of the passenger compartment.

The outline of the sheeted foam elastic material 3 before adhesion to the resin sheet 2 is illustrated by a solid line in FIG. 6. The outline of the sheeted foam elastic material 3 after adhesion to the resin sheet 2 is illustrated by an imaginary line in FIG. 6. (The outlines are also illustrated in FIGS. 1 and 3.) Specifically, the comparison before and after the adhesion of the sheeted foam elastic material 3 to the resin sheet 2 shows that, in the former, the generally rear portion of the sheeted foam elastic material 3 expands downward and backward. The portion illustrated by a solid line and expanding downward and backward recedes to the imaginary line, and, as a result, the cover 3d relaxes after adhesion.

Figure 7:
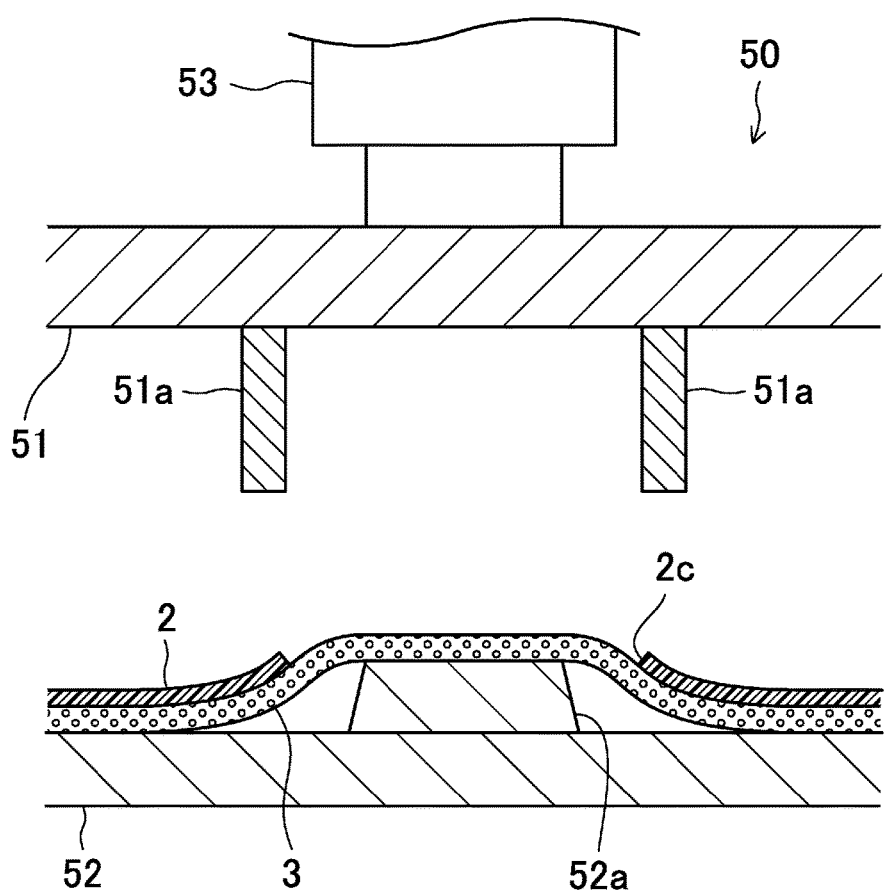
FIG. 7 is a vertical cross-sectional view illustrating how the resin sheet and the sheeted foam elastic material are set on an attaching apparatus.
Figure 8:
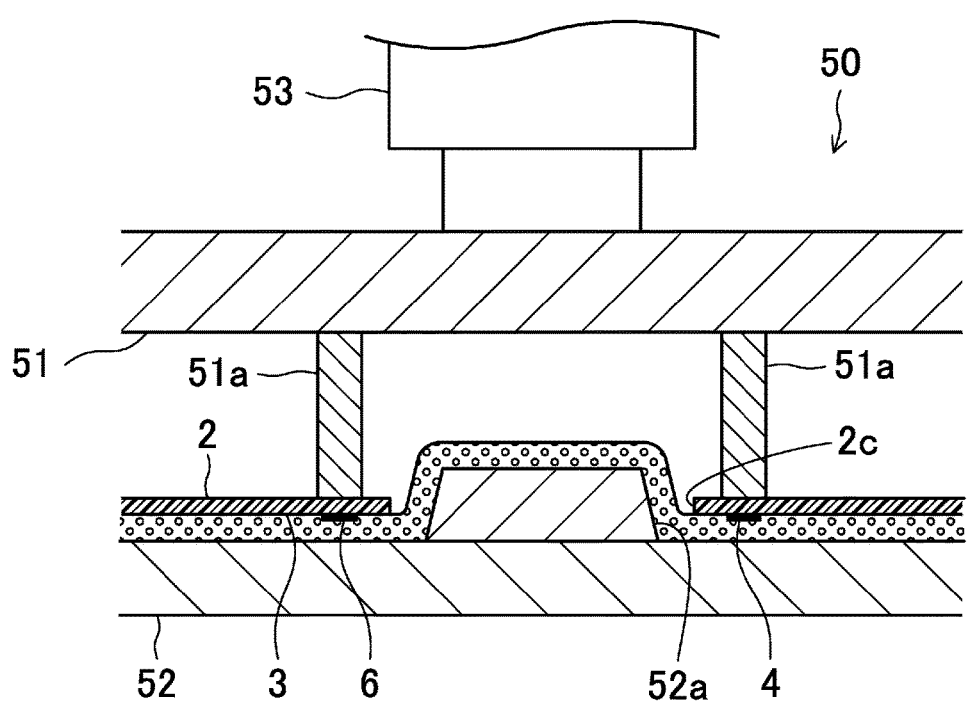
FIG. 8 corresponds to FIG. 7 and illustrates how the resin sheet has adhered to the sheeted foam elastic material.

This will be described in detail with reference to FIGS. 7 and 8. FIGS. 7 and 8 illustrate an attaching apparatus 50 attaching the sheeted foam elastic material 3 to the resin sheet 2, and an adhesion technique. First as to the attaching apparatus 50, the apparatus includes: a movable upper table 51; a secured lower table 52 provided to face a bottom face of the movable upper table 51; and a driving device 53 for moving the movable upper table 51 in vertical direction. The bottom face of the movable upper table 51 is provided with a heating member 51a protruding downward. The heating member 51a includes a not-shown heater for heating the resin sheet 2 to a melting temperature or above. This heating member 51a is only partially illustrated in FIGS. 7 and 8. Actually, the heating member 51a is provided to conform to the shapes of the outer periphery adhesion portion 4, the intermediate adhesion portion 5, and the rear adhesion portion 6 illustrated in FIG. 3.

Meanwhile, the secured lower table 52 has a top face provided with a bulging mold 52a bulging upward. The bulging mold 52a provides the sheeted foam elastic material 3 with a relaxed portion to form the cover 3d. The relaxing degree and outline of the bulging mold 52 are determined such that the cover 3d relaxes as described above after the adhesion.

Described next is the adhesion technique. First, as illustrated in FIG. 7, the movable upper table 51 is left elevated. On the top face of the secured lower table 52, the sheeted foam elastic material 3 and the resin sheet 2 are laid on top of the other in the stated order. Here, the sheeted foam elastic material 3 forms a bulge by the bulging mold 52a. In addition, the bulge of the sheeted foam elastic material 3 is positioned within the inner periphery of the third through hole 2c of the resin sheet 2.

Then, as illustrated in FIG. 8, the driving device 53 lowers the movable upper table 51 so that the heating member 51a presses the resin sheet 2 against the sheeted foam elastic material 3. Hence, the sheeted foam elastic material 3 is closely attached to an exterior face of the bulging mold 52a, and adheres to the resin sheet 2 with the heat from the heating member 51a. Here, a portion to be the cover 3d is not heated, which keeps the portion from deforming by heat and becoming thin.

Next, although not shown, the driving device 53 raises the movable upper table 51 so that, as illustrated in FIG. 3, the automotive door-hole-sealing material 1 including the relaxing cover 3d is obtained.

Effects of Embodiment

When the above automotive door-hole-sealing material 1 is secured to the inner panel 108 of the door 100, the cover 3d of the sheeted foam elastic material 3 relaxes. Even though the impact absorbing material 105 protrudes from the third opening 108c on the inner panel 108 toward the outside of the passenger compartment, the sheeted foam elastic material 3 covers the end of the impact absorbing material 105 with the cover 3d while alleviating high interference with the impact absorbing material 105.

When the automotive door-hole-sealing material 1 is secured to the inner panel 108 of the door 100, the first opening 108a, the second opening 108b, and the third opening 108c on the inner panel 108 are covered. Such a feature makes it possible to keep, for example, rainwater and noise from entering the passenger compartment at the openings, and seal the passenger compartment. Here, if vibration is generated while the car is running, for example, the cover 3d of the sheeted foam elastic material 3 elastically deforms. Such a feature may reduce noise to be generated by the sheeted foam elastic material 3 making contact with the impact absorbing material 105.

The sheeted foam elastic material 3 covers the first opening 108a, the second opening 108b, and the third opening 108c on the inner panel 108. Such a feature allows the sheeted foam elastic material 3 to absorb the noise. The sheeted foam elastic material 3 is provided to avoid the impact absorbing material 105. The cover 3d originally relaxes such that the sheeted foam elastic material 3 keeps from receiving forceful tension. That is why the sheeted foam elastic material 3 is not as thin as a material disclosed in a typical example. Thus, the sheeted foam elastic material 3 maintains high noise absorption and insulating effects, contributing to improvement in quietness in the passenger compartment.

Moreover, the resin sheet 2 contains a material less stretchable than the sheeted foam elastic material 3. In forming the cover 3d, when the sheeted foam elastic material 3 is relaxed and adheres to the resin sheet 2, the resin sheet 2 overcomes the resilience of the sheeted foam elastic material 3 and keeps from stretching, contributing to maintaining the cover 3d to relax.

Other Embodiments

In the above embodiment, the impact absorbing material 105 is provided to protrude from the third opening 108c on the inner panel 108 toward the outside of the passenger compartment. Alternately, the impact absorbing material 105 may be provided to protrude from other openings, namely the openings 108a and 108b, on the inner panel 108. Here, the relaxing cover 3d may be formed in association with a position in which the impact absorbing material 105 is provided.

In the above embodiment, the impact absorbing material 105 is the protrusion of the present disclosure. However, the protrusion is not limited to the impact absorbing material; instead, the protrusion may be a part provided to the door 100.

In the above embodiment, the impact absorbing material 105 protrudes toward the outside of the passenger compartment. Alternatively, for example, a protrusion is provided to protrude from the inside of the door body 101 through an opening of the inner panel 108 toward the inside of the passenger compartment. In order to cover this protrusion, the relaxing cover 3d may be formed on the sheeted foam elastic material 3.

The above embodiments are mare examples in every respect, and shall not be interpreted in a limited manner. Furthermore, any modification and change equivalent to the scope of claims are within the scope of the present disclosure.

As described above, an automotive door-hole-sealing material according to the present disclosure may be secured in use to an inner panel of a door including, for example, an impact absorbing material.

What is claimed is:

1. An automotive door-hole-sealing material covering an opening formed on an inner panel of an automotive door, the automotive door-hole-sealing material comprising:
    a sheeted foam elastic material (i) provided over a protruding end of a protrusion protruding from the opening on the inner panel in an inward-outward direction of a passenger compartment, and (ii) covering the opening; and
    a resin sheet to which the sheeted foam elastic material is fastened, the resin sheet being attached to the inner panel,
    the resin sheet having a through hole formed in association with the protruding end of the protrusion, and
    in a side view, the sheeted foam elastic material has a portion relaxing within an inner periphery of the through hole of the resin sheet.

2. The automotive door-hole-sealing material of claim 1, wherein
    the resin sheet contains a material less stretchable than the sheeted foam elastic material.

3. The automotive door-hole-sealing material of claim 1, wherein
    the relaxing portion of the sheeted foam elastic material is approximately as thick as other portions of the sheeted foam elastic material.

4. The automotive door-hole-sealing material of claim 1, wherein
    the sheeted foam elastic material adheres to a whole outer periphery of the through hole of the resin sheet.

* * * * *